United States Patent [19]

Haut et al.

[11] Patent Number: 5,062,270
[45] Date of Patent: Nov. 5, 1991

[54] METHOD AND APPARATUS TO START-UP CONTROLLED FREEZING ZONE PROCESS AND PURIFY THE PRODUCT STREAM

[75] Inventors: Richard C. Haut, Stavanger, Norway; Eugene R. Thomas, Midland; Robert D. Denton, Houston, both of Tex.

[73] Assignee: Exxon Production Research Company, Houston, Tex.

[21] Appl. No.: 576,059

[22] Filed: Aug. 31, 1990

[51] Int. Cl.⁵ .................................................. F25J 5/00
[52] U.S. Cl. .......................................... 62/12; 62/18; 62/20; 62/28; 62/44
[58] Field of Search ............ 62/12, 18, 20, 23, 24, 62/27, 28, 31, 32, 42, 44

[56] References Cited

U.S. PATENT DOCUMENTS

| | | | |
|---|---|---|---|
| 4,383,841 | 5/1983 | Ryan et al. | 62/20 |
| 4,417,909 | 11/1983 | Weltmer et al. | 62/12 |
| 4,462,814 | 7/1984 | Holmes et al. | 62/20 |
| 4,533,372 | 8/1985 | Valencia et al. | 62/12 |
| 4,636,334 | 1/1987 | Skinner et al. | 62/20 |
| 4,761,167 | 8/1988 | Nicholas et al. | 62/20 |

*Primary Examiner*—Ronald C. Capossela
*Attorney, Agent, or Firm*—Vaden, Eickenroht Thompson & Boulware

[57] ABSTRACT

The invention relates to a method and apparatus for start-up, transformation from start-up to normal operation and normal separation of carbon dioxide and other acid gases from methane using a distillation column with a controlled freezing zone. Normally, the feedstream is treated in at least one distillation zone, a controlled freezing zone, and another acid gas stripping apparatus. The freezing zone produces a carbon dioxide slush which is melted and fed into a distillation section and a methane-enriched stream which is fed to a separate stripping unit. Start-up is accomplished by refluxing the product stream from the separate stripping unit to the distillation column. Transformation is accomplished by separating the methane-enriched stream produced by the freezing zone into a liquid component for refluxing to the column and a vapor component to be fed to the separate stripping unit.

60 Claims, 3 Drawing Sheets

METHOD AND APPARATUS TO START-UP CONTROLLED FREEZING ZONE PROCESS AND PURIFY THE PRODUCT STREAM

FIELD OF THE INVENTION

The invention is a method for start-up and transformation from start-up to continuous operation for separation of carbon dioxide and other acid gases from methane by treating the mixture of methane and acid gases in at least one distillation zone and a controlled freezing zone, followed by a stripping zone. The invention includes the apparatus suitable for practicing the process.

BACKGROUND AND SUMMARY OF THE INVENTION

Many natural gas reservoirs contain relatively low percentages of hydrocarbons (less than 40%, for example) and high percentages of acid gases, principally carbon dioxide, but also hydrogen sulfide, carbonyl sulfide, carbon disulfide and various mercaptans.

Carbon dioxide acts as a diluent and, in the amount noted above, significantly lowers the heat content of the natural gas. The sulfur-bearing compounds are noxious and may be lethal. In addition, in the presence of water, these components render the gas very corrosive. The specifications for pipeline quality gas typically call for a maximum of 2%-4% carbon dioxide. Specifications for natural gas liquids recovery processes and helium recovery processes typically require less than 1% carbon dioxide. Specifications for a natural gas liquifaction plant typically require less than 100 ppm of carbon dioxide, while nitrogen rejection processes typically require less than 50 ppm of carbon dioxide. The processes requiring less than 100 ppm of carbon dioxide utilize what is commonly referred to as ultra-pure product. Because of the typical specifications, removal of acid gases from well production in remote locations is desirable to provide conditioned or sweet, dry natural gas either for delivery to a pipeline, natural gas liquids recovery, helium recovery, conversion to liquid natural gas or nitrogen rejection.

The separation of carbon dioxide from methane is difficult and consequently significant work has been applied to the development of methane/carbon dioxide separation methods. These processes can be placed into four general classes: absorption by physical solvents, absorption by chemical solvents, adsorption by solids and distillation. Distillation of mixtures of methane and acid gases including carbon dioxide can present significant difficulties. The difficulties are due to the unusual variation of the phases in equilibrium of mixtures of methane and carbon dioxide at different temperatures, pressures and ratios. The first figures of U.S. Pat. No. 4,533,372, issued Aug. 6, 1985, to Valencia et al, the disclosure of which is incorporated herein by reference as if set forth in its entirety, represents the characteristics of carbon dioxide and methane mixtures which lead to solid, liquid and vapor three phase equilibrium. Obviously, the formation of solids in a distillation column has the potential for plugging the column and its associated equipment.

Cryogenic distillations, such as disclosed by Valencia et al, provide for the separation of methane and carbon dioxide utilizing the formation of solid carbon dioxide in equilibrium with vapor-liquid mixtures of carbon dioxide and methane at particular conditions of temperature and pressure in a controlled freezing zone. The column typically consists of a lower distillation zone, a controlled freezing zone, and an upper distillation zone. It should be understood that an upper distillation zone is preferable, but not required.

The lower distillation zone is operated normally at a temperature and pressure at which substantially no carbon dioxide solids are formed to produce an enriched carbon dioxide liquid bottoms stream and vapor feedstream of methane and carbon dioxide, which progresses to the controlled freezing zone. The vapor feedstream is contacted with at least one liquid feedstream containing methane in a controlled freezing zone at a temperature and pressure producing both carbon dioxide-containing solids and a methane-enriched vapor stream. The methane-enriched vapor stream formed in the controlled freezing zone is contacted with a methane-enriched liquid stream in an upper distillation zone at a temperature and pressure at which substantially no carbon dioxide solids are produced. The methane produced in the upper distillation zone meets most specifications for pipeline delivery. However, more stringent specifications for higher purity natural gas exist for applications such as helium recovery, cryogenic natural gas liquids recovery, conversion to liquid natural gas, and nitrogen rejection. The more stringent specifications may be met by increasing the height of the upper distillation zone and/or increasing the liquid methene reflux.

During start-up operations of cryogenic distillation utilizing a controlled freezing zone, a liquid reflux must be generated and fed back to the distillation column to provide cooling for the system and begin the reflux necessary for efficient separation at operating temperatures. The liquid reflux may be fed at the top of the tower, to the controlled freezing zone, or to both the top of the tower and the controlled freezing zone during start-up.

During start-up operations, it is necessary to prevent carbon dioxide solidification outside the controlled freezing zone while the tower is cooled to operating temperatures. Currently, cryogenic distillation processes are started by using an essentially pure methane feedstream or by injecting small quantities of propane, heavier hydrocarbon or methanol into the system. The liquid reflux generated during start-up using the pure methane feedstream does not contain any carbon dioxide, while the presence of hydrocarbons including propane or methanol suppresses the solidification of any carbon dioxide present in the generated liquid reflux.

Cryogenic distillation utilizing a controlled freezing zone may be desirable at locations where pure methane, propane or methanol are unavailable. One such location would be a remote field where a cryogenic distillation could be used to generate fuel gas. Therefore, the need exists to provide a method and apparatus to start-up a cryogenic distillation process utilizing a controlled freezing zone without the need for pure methane or other additives used in start-up to suppress carbon dioxide solidification. The need for an ultra pure product produced with relaxed control standards also exists.

This invention relates generally to the start-up process of a cryogenic distillation column with a controlled freezing zone using methane feed containing acid gases and after start-up the further purification of the product stream. Specifically, the method of the invention supplements cryogenic distillation. The first step is stripping or removing the acid gas components from the upper distillation zone overhead stream. The second step is refluxing the stream stripped of acid gases to the cryogenic distillation column during start-up of the column. Another related process of the invention is stripping the acid gas components from the vapor phase of the upper distillation zone overhead stream to produce ultra pure product during operation after start-up.

Another process of the invention is transforming the cryogenic distillation column from start-up conditions to operating conditions. The method of the related process has multiple steps. The first step is stripping or removing the acid gas components from the upper distillation zone overhead stream. The second step is refluxing the stream stripped of acid gases to the cryogenic distillation column during start-up of the column. These steps are continuously repeated until the cryogenic distillation column approaches operating conditions. The next step is to redirect the upper distillation zone overhead stream from the stripping apparatus to a separator. In the separator the upper distillation zone overhead stream is divided into vapor and liquid components. The next step is stripping or removing the acid gas components from the vapor component of the overhead stream. The final step is refluxing or returning the liquid component of the overhead stream to the distillation column.

DESCRIPTION OF THE PREFERRED METHODS AND APPARATUS

Cryogenic distillation of carbon dioxide and methane can be accomplished with a distillation column utilizing a controlled freezing zone similar to that taught by U.S. Pat. No. 4,533,372, Valencia et al.

Figure 1:
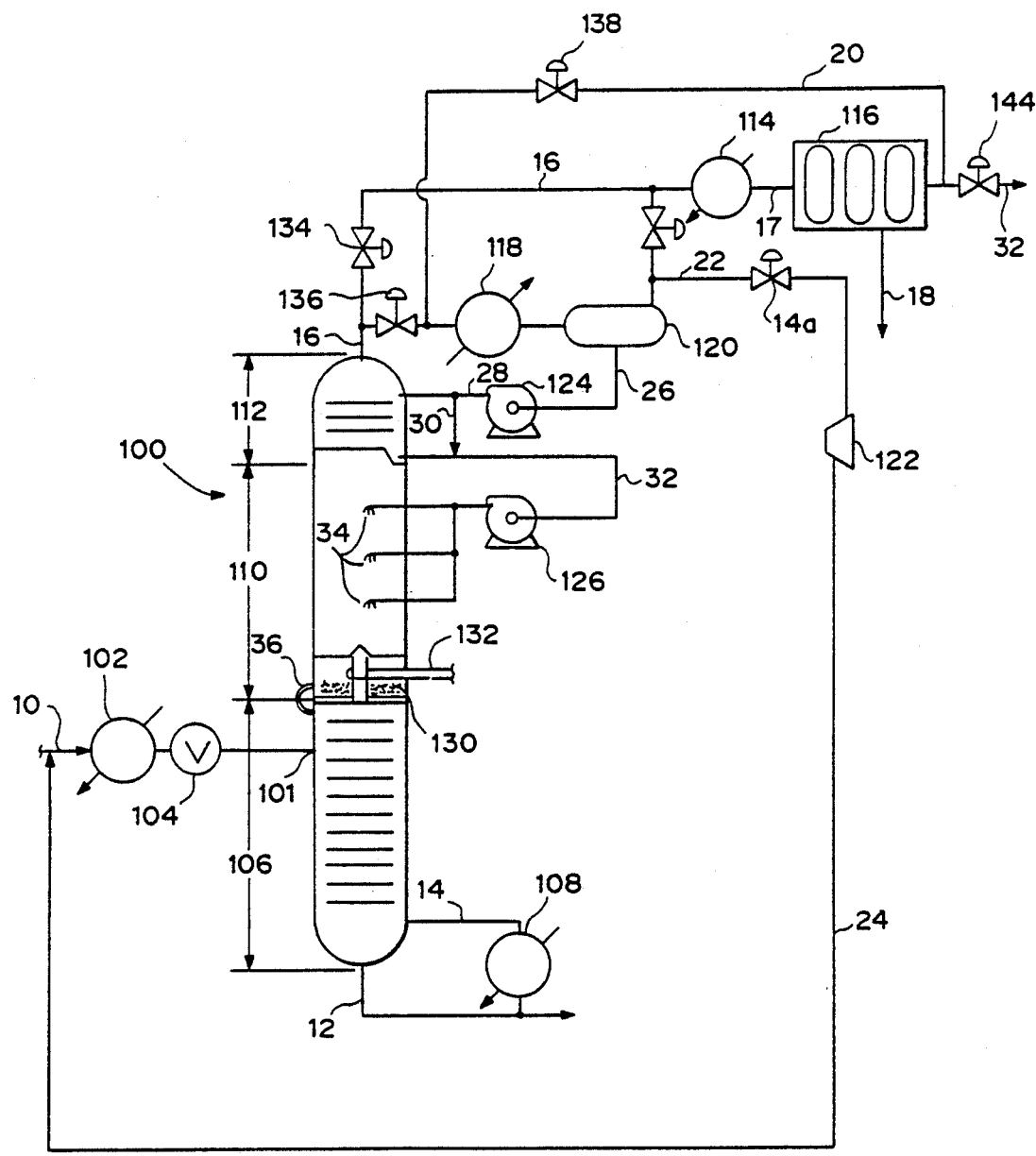
FIG. 1 is a schematic representation of the apparatus for start-up and transformation to continuous operations of cryogenic distillation tower with a controlled freezing zone with a feedstream of methane with acid gases.
Figure 2:
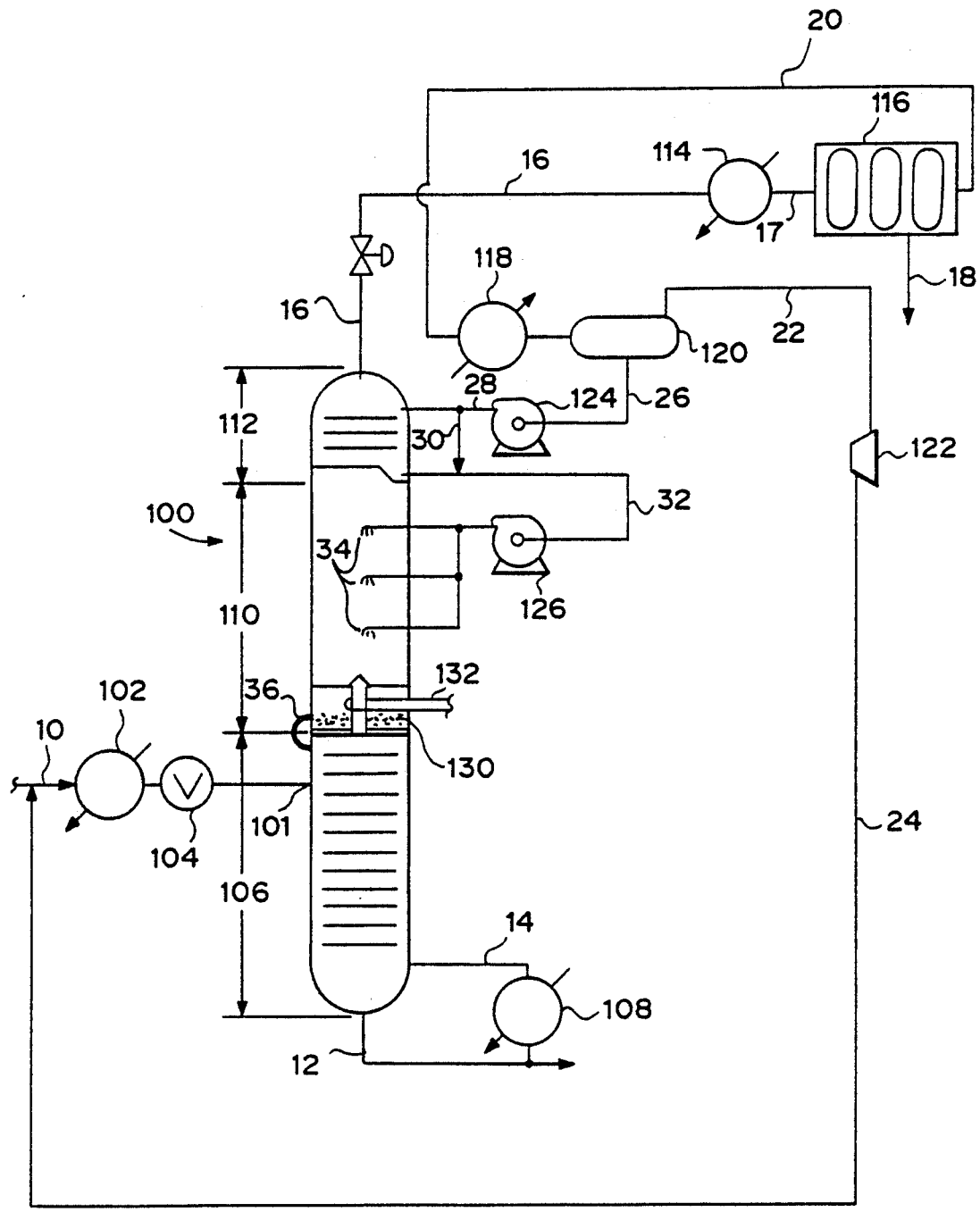
FIG. 2 is a schematic drawing of the apparatus for start-up operations.
Figure 3:
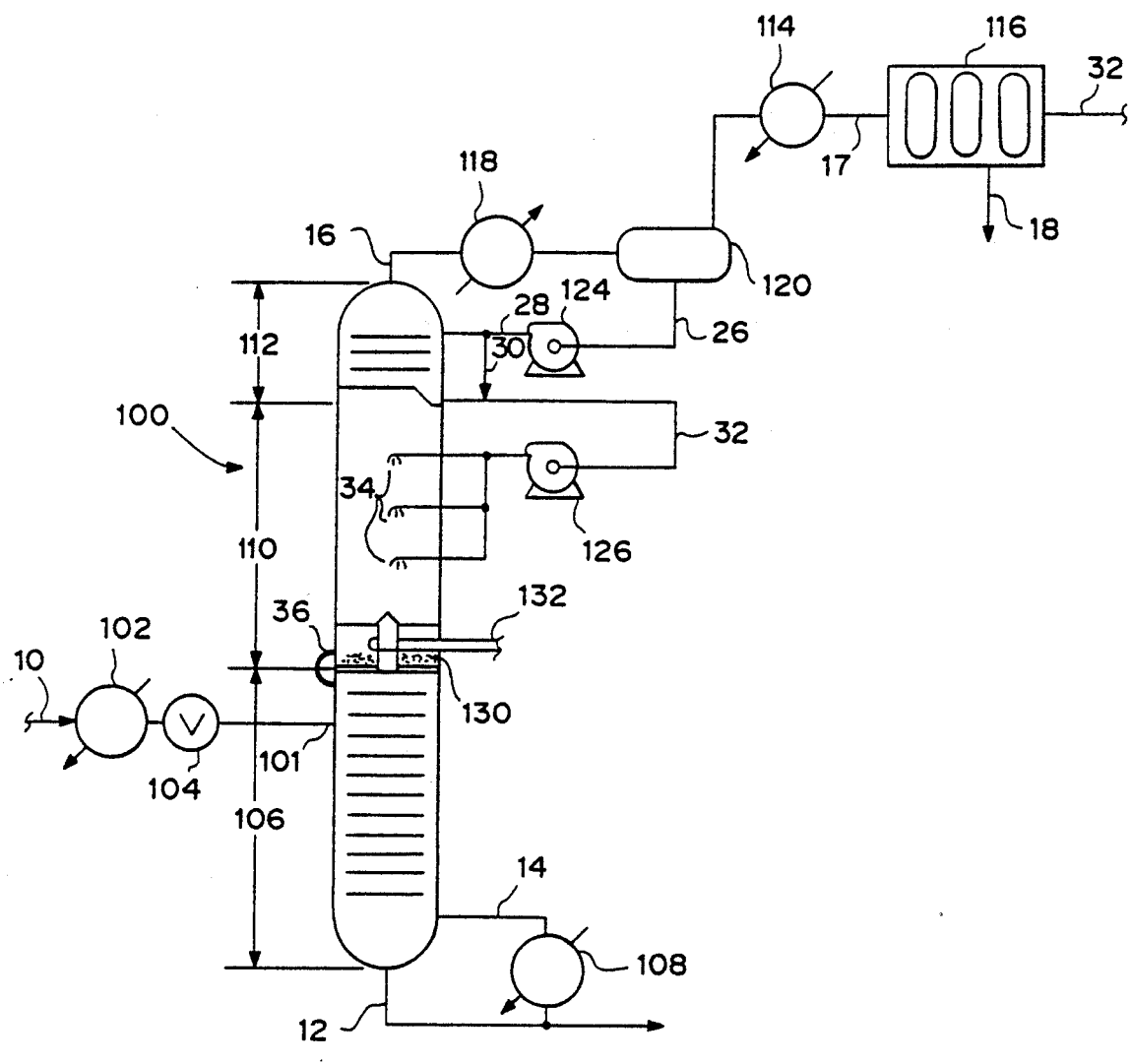
FIG. 3 is a schematic drawing of the apparatus for continuous operation.

As illustrated in schematic fashion in FIG. 1, the disclosed method of start-up of a controlled freezing zone process, conversion from start-up to continuous operation and purification of the product stream during continuous operations preferably utilize the same apparatus components. FIG. 2 is a simplification of FIG. 1 to further illustrate the operative method used during start-up. FIG. 3 is a simplification of FIG. 1 to illustrate the operative method of this invention to produce ultra pure product during continuous operation.

The column requires a start-up procedure after completion and after being shut down for routine maintenance. Initially, valves 134, 138 and 142 are open while valves 136, 140 and 144 are closed. During start-up, a dried gas stream from a wellhead containing methane, carbon dioxide and other acid gases, such as nitrogen, hydrogen sulfide, and other hydrocarbons is introduced in line 10. The mixture of acid gases and methane is cooled by inlet cooler 102 and expansion valve 104 to a suitable temperature and pressure as disclosed by Valencia et al before being introduced into the column 100 at inlet 101. A lower distillation zone 106 in the column produces an enriched carbon dioxide liquid bottoms stream and a freezing zone vapor feedstream at a temperature and pressure at which substantially no carbon dioxide solids are formed. The bottoms stream leaves the column in line 12. A portion of the stream 12 is drawn off as a bottoms product and a portion is heated in reboiler 108 and returned to the bottom of the column through line 14. This is only one method of reboiling the column. Other techniques can be used as well. Initially, the freezing zone will be too warm for the vapor to condense or solidify so that virtually all of the freezing zone vapor feedstream rises through the freezing zone 110 and the upper distillation zone 112. The vapor leaves the upper distillation zone as an overhead stream through line 16 and is preferably heated by overhead heater 114.

Initially, the upper distillation zone overhead stream is essentially the same composition as the freezing zone vapor feedstream produced in the lower distillation zone. The upper distillation zone may be omitted but is preferable to provide increased product purity after start-up.

The acid gas components leave overhead heater 114 through line 17 and are stripped from the methane in the upper distillation zone overhead stream with an adsorbent 116, preferably a molecular sieve bed operated at a temperature and pressure near the temperature and pressure of the upper distillation zone overhead stream. Heater 114 is used if necessary to heat the stream to an optimal temperature for adsorption depending on the type of adsorbent used. A preferred molecular sieve bed is a Linde molecular sieve Type 5A, aluminosilicates of calcium form that have undergone heating to remove water of hydration so that calcium ions blocking the passages result in molecular sieve cubic crystals with openings which are about 5.3 angstroms. This molecular sieve has a particular affinity for unsaturated and polar molecules like carbon dioxide and water. Other adsorbents with affinity for acid gases may be used and are known to those skilled in the art. After adsorption, the temperature of the absorbent 116 may be increased to a temperature sufficient to release the adsorbed molecules, typically about 250°-350° F. This process is known as thermal swing adsorption.

In the alternative, the pressure may be decreased from the operating pressure of the column, typically about 550-600 psi, to a pressure sufficiently low to release the adsorbed molecules, typically near atmospheric pressure, to release these acid gases and rejuvenate the molecular sieve bed. This process is known as pressure swing adsorption. A combination of pressure and temperature can also be used where desirable.

The molecular sieve strips the acid gases from the methane in the upper distillation zone overhead stream by utilizing either pressure swing adsorption and/or temperature swing adsorption. At particular temperatures and pressures near the operational temperatures and pressures of the distillation column, small molecules, like the acid gases, are adsorbed by the molecular sieve bed. The temperature of the molecules attained is then increased, the pressure is decreased, or both, releasing the adsorbed molecules. By then decreasing the temperature or increasing the pressure to continuous operation conditions, the molecular sieve is returned to operation. Countercurrent adsorption systems and batch treatment may also be used to strip acid gases from the methane. The acid gas components are removed via line 18.

The resultant acid gas stripped methane stream leaves the adsorbent 116 through line 20 and is partially condensed by condenser 118 and collected in separator 120. The resultant stripped methane may approach the purity attained during continuous operations or may be less pure depending upon the flow rate of the overhead stream and the effective adsorbtion rate of the commercial absorbent. Therefore, the size of the molecular sieve bed and the time elapsed since rejuvenation of the molecular sieve bed affects product purity. The vapor component of the stripped stream is drawn off through line 22, compressed by compressor 122, and fed through line 24 into the feedstream in line 10. Alternatively, it may be heated for use as plant fuel or flared.

After filling separator 120 to a suitable level, typically ⅓ to ⅔ full, then the liquid component of the stripped methane stream is drawn off through line 26 by reflux pump 124 thereby providing a methane-enriched liquid stream to the upper distillation zone 112 of the distillation column through line 28. Alternatively, the liquid component may be routed to by-pass the upper distillation zone through lines 30 and 32 to provide the freezing zone liquid feedstream containing methane injected through multiple sprayer lines 34 to the controlled freezing zone 110 of the distillation column as regulated by controlled freezing zone pump 126. Another alternative is for the liquid component of the stripped methane stream to provide both the methane-enriched liquid stream to the upper distillation zone 112 of the distillation column and the sprayer lines 34 of the freezing zone liquid feedstream container methane to the controlled freezing zone 110 of the distillation column. The methane-enriched liquid stream refluxed to the upper distillation zone 112 is contacted with the methane-enriched vapor stream in the upper distillation zone 112, operated at a temperature and pressure at which substantially no carbon dioxide solids are produced to form an upper distillation zone overhead stream and an upper distillation zone bottoms stream. The upper distillation zone overhead stream is thus of higher methane content than the methane-enriched vapor stream as it enters the upper distillation zone. The upper distillation zone bottoms stream may be drawn off through line 32 to provide the freezing zone liquid feedstream. The upper distillation zone bottoms stream from line 32 may be combined with the liquid component of the stripped methane stream from lines 28 and 30 before entering the freezing zone liquid feedstream in line 32.

As the column 100 approaches operational temperatures and pressure, solids containing primarily carbon dioxide will begin to precipitate as the freezing zone vapor feedstream contacts the freezing zone liquid feedstream at a temperature and pressure wherein both solids containing carbon dioxide and a methane-enriched vapor stream are formed, forming a mass of solid precipitant 130. The precipitant is heated by heater 132 to form liquid carbon dioxide for collection from the lower distillation zone by line 36.

When the column has reached the desired operational temperature and pressure, valve 134 in line 16, valve 138 in line 20 and valve 142 in line 22 are closed.

Closing valve 134 shuts down the process of stripping the acid gas components from the methane in the upper distillation zone overhead stream. Closing valve 138 stops the reflux of the stripped methane stream through line 20. Closing valve 142 stops the reflux of the vapor component of the stripped methane stream to the column feedstream in line 10 through lines 22 and 24. At substantially the same time as valves 134, 138 and 142 are closed, valves 136, 140 and 144 are opened.

Opening valve 136 directs the upper distillation zone overhead stream to overhead condenser 118. Opening valve 140 directs the vapor component of the upper distillation zone overhead stream to overhead heater 114, allowing the adsorbent 116 required for start-up to be utilized for further purification of the product produced during continuous operation. Opening valve 144 allows the methane remaining after the separation of carbon dioxide and other acid gases to be drawn off as a product through line 32. The column is transformed from start-up operations to continuous operating conditions.

In continuous operation, the upper distillation zone overhead stream 16 is separated into vapor and liquid components in separator 120. The vapor component may be drawn off through line 32 as final product for sale to a pipeline stripped of the remaining acid components by the same adsorbent stripping means 116 as used in the start-up procedure, preferably a molecular sieve bed utilizing pressure swing adsorption or thermal swing adsorption, to provide ultra pure product. The liquid component is refluxed through line 26 to provide a methane-enriched liquid stream to either the upper distillation zone of the distillation column or to the controlled freezing zone of the distillation column as regulated by controlled freezing zone pump 126 reflux pump 124 or both.

FIG. 2 details a preferred method used during start-up of a distillation column with a controlled freezing zone and the preferred apparatus for use for start-up of a distillation column having at least a lower distillation zone and a controlled freezing zone. The reference numerals for FIG. 1 are used to indicate the same parts of the apparatus. A mixture of acid gases and methane in line 10 is cooled by inlet cooler 102 and expansion valve 104 to a suitable temperature and pressure as disclosed by Valencia et al and fed to the lower distillation zone 106 in the column 100 at inlet 101. The lower distillation zone 106, operating at a temperature and pressure at which substantially no carbon dioxide solids are formed, produces an enriched carbon dioxide liquid bottoms stream and a freezing zone vapor feedstream. Part of the liquid bottoms stream is drawn off as a bottoms product in line 12. The remainder of the liquid bottoms stream is heated in reboiler 108 and returned to the bottom of the lower distillation zone through line 14. The freezing zone vapor feedstream rises from the lower distillation zone into the controlled freezing zone 110.

During the early steps of start-up, the temperature of the controlled freezing zone 110 is high enough so that virtually no acid gases in the freezing zone vapor feedstream will condense or solidify as the vapor feedstream rises through the controlled freezing zone. The freezing zone vapor feedstream will preferably rise into the upper distillation zone 112, or if the upper distillation zone 112 is omitted, leave the distillation column 100 as an overhead stream through line 16. Because there is no reflux initially, the vapor feedstream entering the upper distillation zone 112 will leave the upper distillation zone through line 16 as an overhead stream with essentially the same composition as the freezing zone vapor feedstream that entered the upper distillation zone.

The overhead stream in line 16 is a methane enriched vapor stream, which is preferably heated by overhead heater 114 to the minimal temperature necessary for efficient operation of a commercial adsorbent. The methane-enriched stream then is stripped of its acid gas components by an adsorbent 116, preferably a molecular sieve bed, operated at a temperature and pressure approaching the temperature and pressure of the overhead stream as it leaves the distillation column as nearly as is feasible to produce an acid gas stripped stream. The acid gas stripped stream leaves the commercial adsorbent through line 20, is partially condensed by condenser 118 and collected in separator 120. The vapor component of the acid gas stripped stream is preferably drawn off through line 22 for compression by compressor 122 and fed through line 24 into the feedstream in line 10. It should be understood that it is not necessary to compress and reflux the vapor component of the stripped stream, but it is preferable to do so.

The liquid component of the acid gas stripped stream is preferably refluxed through line 26 by reflux pump 124 thereby providing a methane-enriched liquid stream to the upper distillation zone 112 of the distillation column through line 28. Alternatively, the acid gas stripped stream may be routed through lines 26, 28, 30 and 32 to provide a freezing zone liquid feedstream containing methane to be injected through sprayer lines 34 by controlled freezing zone pump 126 to contact the freezing zone vapor feedstream in the controlled freezing zone. Further, the liquid component of the acid gas stripped stream may be refluxed to provide both the methane-enriched liquid stream to the upper distillation zone 112 and freezing zone liquid feedstream containing methane. It should be understood that if the upper distillation zone has been omitted from the distillation column, reflux pump 124 will also be omitted so that the liquid component of the acid gas stripped stream will be refluxed through lines 26 to line 32 (connection between lines 26 and 32 not shown on FIG. 2) by controlled freezing zone pump 126 to provide the freezing zone liquid feedstream injected through sprayer lines 34.

As the controlled freezing zone approaches operational temperature and pressures, solids containing carbon dioxide and a methane-enriched vapor stream will form when the freezing zone liquid feedstream containing methane contacts the freezing zone vapor feedstream. The solids containing carbon dioxide will collect as a mass of solid precipitant 130, which is heated by heater 132 to form liquid carbon dioxide, preferably for transfer to the lower distillation zone through line 30. When the distillation column reaches the desired operational temperature and pressures, the column is transformed from start-up operations to continuous operating condition.

FIG. 3 details a preferred method and apparatus for separating a feedstream containing carbon dioxide and other acid gases from methane to produce an ultra pure product. The reference numerals of FIG. 1 are used to indicate the same parts of the apparatus. A feedstream containing acid gases containing methane are fed through line 10 to the lower distillation zone 106 of a distillation column 100 at inlet 101 containing a lower distillation zone 106, a controlled freezing zone 110 and an upper distillation zone 112. It should be understood that the upper distillation zone 112 may be omitted, but is preferably present. The lower distillation zone 106 operates at a temperature and pressure at which substantially no carbon dioxide solids are formed to produce an enriched carbon dioxide liquid bottoms stream and a freezing zone vapor feedstream. The bottoms stream leaving the column in line 12 is split, with part drawn off as a bottoms product and the remainder being heated by reboiler 108 and returned to the lower distillation zone by line 14.

The freezing zone vapor feedstream rises into the controlled freezing zone 110, where it is contacted with at least one freezing zone liquid feedstream containing methane dispensed from sprayer heads 34 at a temperature and pressure such that both solids containing carbon dioxide and a methane-enriched vapor stream are formed. The solids containing carbon dioxide collects as a mass of solid precipitant 130, which is heated by heater 132 to form liquid carbon dioxide, preferably for transfer to the lower distillation zone through line 36.

The methane-enriched vapor stream preferably rises into an upper distillation zone 112, where it is contacted by a methane-enriched liquid stream at a temperature and pressure at which substantially no carbon dioxide solids are formed to produce a methane-enriched overhead stream and an upper distillation zone bottoms stream. The bottoms stream is refluxed through line 32 by controlled freezing zone pump 126 to provide a freezing zone liquid feedstream injected into the controlled freezing zone 110 by sprayer 34. The overhead stream leaves the upper distillation zone 110 through line 16. It should be understood that if the upper distillation zone 110 is omitted, the methane-enriched vapor stream would leave the controlled freezing zone 110 through line 16.

The methane-enriched stream in line 16 is preferably partially condensed by condenser 118 and collected in separator 120, where it is separated into vapor and liquid components. The liquid component of the methane-enriched stream is removed through line 26 by reflux pump 124 and preferably refluxed through line 28 to provide a methane-enriched liquid stream to the upper distillation zone and by controlled freezing zone pump 126 through lines 30 and 32 and sprayer 34 to provide the freezing zone vapor feedstream in the controlled freezing zone. The vapor component of the methane-enriched stream is heated by overhead heater 114 to a temperature where an adsorbent will operate efficiently and then stripped of the remaining acid components by an adsorbent 116, preferably a molecular sieve bed to produce ultra pure product in line 32. The acid gas components are drawn off from the adsorbent through line 18 as necessary to maintain efficient operation.

We claim:

1. A method for start-up of a distillation column with a controlled freezing zone comprising the steps:
    feeding a mixture of at least one acid gas and methane to a lower distillation zone;
    producing in said lower distillation zone an enriched carbon dioxide liquid bottoms stream and a freezing zone vapor feedstream at a temperature and pressure at which substantially no carbon dioxide solids are formed;
    contacting said freezing zone vapor feedstream with at least one freezing zone liquid feedstream containing methane in a controlled freezing zone at a temperature and pressure wherein both solids containing carbon dioxide and a methane-enriched vapor stream are formed;
    stripping the acid gas component from the methane-enriched vapor stream to produce an acid gas stripped stream;
    separating said stripped stream into liquid and vapor components; and
    refluxing the liquid component of said stripped stream to the distillation column.

2. The method of claim 1 further comprising the step of:
   refluxing the liquid component of the stripped stream to provide at least one liquid feedstream to the controlled freezing zone of the distillation column.

3. The method of claim 1 wherein the stripping step utilizes a molecular sieve bed.

4. The method of claim 1 wherein the stripping step utilizes pressure swing adsorption in a molecular sieve bed.

5. The method of claim 1 wherein the stripping step utilizes thermal swing adsorption in a molecular sieve bed.

6. A method of claim 1 wherein the stripping step utilizes pressure swing adsorption and thermal swing adsorption in a molecular sieve.

7. The method of claim 1 wherein the vapor component of the stripped stream is refluxed into the distillation column feedstream.

8. A method for separating a feedstream containing carbon dioxide acid gas and methane comprising the steps of:
   feeding carbon dioxide containing methane to a lower distillation zone of a distillation column;
   producing in said lower distillation zone an enriched carbon dioxide liquid bottoms stream and a freezing zone vapor feedstream at a temperature and pressure at which substantially no carbon dioxide solids are formed;
   contacting said freezing zone vapor feedstream with at least one freezing zone liquid feedstream containing methane in a controlled freezing zone at a temperature and pressure wherein both solids containing carbon dioxide and a methane-enriched vapor stream are formed;
   separating said methane-enriched stream into liquid and vapor components;
   refluxing the liquid component of the methane-enriched stream to the column; and
   stripping the remaining acid component from the vapor component of the methane-enriched stream.

9. The method of claim 8 wherein the stripping step utilizes a molecular sieve bed.

10. The method of claim 8 wherein the stripping step utilizes pressure swing adsorption in a molecular sieve bed.

11. The method of claim 8 wherein the stripping step utilizes thermal swing adsorption in a molecular sieve bed.

12. A method of claim 8 wherein the stripping step utilizes pressure swing adsorption and thermal swing adsorption in a molecular sieve.

13. The method of claim 8 wherein the acid components stripped from said vapor components are combined with the dried acid gases containing methane before being fed to the lower distillation zone.

14. The method of claim 8 wherein the acid components from said vapor components are combined with the acid gases containing methane before being fed to the lower distillation zone.

15. The method of claim 8 further comprising the step of:
   refluxing the liquid component of the methane-enriched vapor stream to provide the freezing zone liquid feedstream.

16. A method of claim 8 wherein the feedstream contains at least one acid gas in addition to carbon dioxide.

17. A method of transforming a distillation column with a controlled freezing zone from start-up conditions to after start-up operating conditions comprising the steps of:
   feeding at least one acid gas containing methane to a lower distillation zone;
   producing in said lower distillation zone an enriched carbon dioxide liquid bottoms stream and a freezing zone vapor feedstream at a temperature and pressure at which substantially no carbon dioxide solids are formed;
   contacting said freezing zone vapor feedstream with at least one freezing zone liquid feedstream containing methane in a controlled freezing zone at a temperature and pressure wherein both solids containing carbon dioxide and a methane-enriched vapor stream are formed;
   stripping the acid gas component from the stream to produce an acid gas stripped stream;
   separating said stripped stream into liquid and vapor components;
   refluxing the liquid component of said stripped stream to the distillation column;
   continuing the reflux of the distillation column until operating temperature has been achieved;
   redirecting the methane-enriched vapor stream from the stripping means to a separating means;
   separating the methane-enriched vapor stream into vapor and liquid components;
   stripping the remaining acid gas components from the vapor component of the methane-enriched vapor stream; and
   refluxing the liquid component of the methane-enriched vapor stream to the tower.

18. The method of claim 17 wherein the step stripping the vapor component of the methane-enriched vapor stream of the remaining acid gas components is accomplished by the same stripping means that was required for the step stripping the acid gas components from the methane-enriched vapor stream.

19. The method of claim 17 further comprising the step of:
   refluxing said liquid component of the methane-enriched vapor stream to provide the freezing zone liquid feedstream.

20. A method of transforming a distillation column with a controlled freezing zone from start-up conditions to after start-up operating conditions comprising the steps of:
   feeding at least one acid gas containing methane to a lower distillation zone;
   producing in said lower distillation zone an enriched carbon dioxide liquid bottoms stream and a freezing zone vapor feedstream at a temperature and pressure at which substantially no carbon dioxide solids are formed;
   contacting said freezing zone vapor feedstream with at least one freezing zone liquid feedstream containing methane in a controlled freezing zone at a temperature and pressure wherein both solids containing carbon dioxide and a methane-enriched vapor stream are formed;
   stripping the acid gas component from the methane-enriched vapor stream to produce an acid gas stripped stream;
   separating said stripped stream into liquid and vapor components;

refluxing the liquid component of said stripped stream to the distillation column;

continuing the reflux of the distillation column until operating temperature has been achieved;

redirecting the methane-enriched vapor stream from the stripping means to a separating means;

separating the methane-enriched vapor stream into vapor and liquid components; and refluxing the liquid component of the methane-enriched vapor stream to the distillation column.

21. The method of claim 20 further comprises the step of:

refluxing said liquid component of the methane-enriched vapor stream to provide the freezing zone liquid feedstream.

22. A method for start-up of a distillation column with a controlled freezing zone comprising the steps:

feeding a mixture of at least one acid gas and methane to a lower distillation zone;

producing in said lower distillation zone an enriched carbon dioxide liquid bottoms stream and a freezing zone vapor feedstream at a temperature and pressure at which substantially no carbon dioxide solids are formed;

contacting said freezing zone vapor feedstream with at least one freezing zone liquid feedstream containing methane in a controlled freezing zone at a temperature and pressure wherein both solids containing carbon dioxide and a methane-enriched vapor stream are formed;

contacting said methane-enriched vapor stream with a methane-enriched liquid stream in an upper distillation zone operated at a temperature and pressure at which substantially no carbon dioxide solids are produced to form an upper distillation zone overhead stream and an upper distillation zone bottoms stream;

stripping the acid gas component from the upper distillation zone overhead stream to produce an acid gas stripped stream;

separating said stripped stream into liquid and vapor components; and refluxing the liquid component of said stripped stream to the distillation column.

23. The method of claim 22 further comprising the step of refluxing the liquid component of the stripped stream to provide the methane-enriched liquid stream to the upper distillation zone of the distillation column.

24. The method of claim 22 further comprising the step of:

refluxing the liquid component of the stripped stream to provide at least one liquid feedstream to the controlled freezing zone of the distillation column.

25. The method of claim 22 further comprising the step of:

refluxing the liquid component of the stripped liquid stream to provide both the methane-enriched liquid stream to the upper distillation zone and at least one freezing zone liquid feedstream.

26. The method of claim 22 wherein the stripping step utilizes a molecular sieve bed.

27. The method of claim 22 wherein the stripping step utilizes pressure swing adsorption in a molecular sieve bed.

28. The method of claim 22 wherein the stripping step utilizes thermal swing adsorption in a molecular sieve bed.

29. The method of claim 22 wherein the stripping step utilizes thermal swing adsorption and pressure swing adsorption in a molecular sieve.

30. The method of claim 22 wherein the vapor component of the stripped stream is refluxed into the distillation column feedstream.

31. A method for separating a feedstream containing at least one acid gas from methane comprising the steps of:

feeding at least one acid gas containing methane to a lower distillation zone of a distillation column;

producing in said lower distillation zone an enriched carbon dioxide liquid bottoms stream and a freezing zone vapor feedstream at a temperature and pressure at which substantially no carbon dioxide solids are formed;

contacting said freezing zone vapor feedstream with at least one freezing zone liquid feedstream containing methane in a controlled freezing zone at a temperature and pressure wherein both solids containing carbon dioxide and a methane-enriched vapor stream are formed;

contacting said methane-enriched vapor stream with a methane-enriched liquid stream in an upper distillation zone operated at a temperature and pressure at which substantially no carbon dioxide solids are produced to form an upper distillation zone bottoms stream;

separating said overhead stream into liquid and vapor components;

refluxing the liquid component of the upper distillation zone overhead stream to the column; and stripping the remaining acid components from the vapor component of the upper distillation zone overhead stream.

32. The method of claim 31 wherein the stripping step utilizes a molecular sieve bed.

33. The method of claim 31 wherein the stripping step utilizes pressure swing adsorption in a molecular sieve bed.

34. The method of claim 31 wherein the stripping step utilizes thermal swing adsorption in a molecular sieve bed.

35. The method of claim 31 wherein the stripping step utilizes thermal swing adsorption and pressure swing adsorption in a molecular sieve.

36. The method of claim 32 wherein the acid components stripped from said vapor components are combined with the dried acid gases containing methane before being fed to the lower distillation zone.

37. The method of claim 30 wherein the acid components from said vapor components are combined with the acid gases containing methane before being fed to the lower distillation zone.

38. The method of claim 30 further comprising the step of:

refluxing the liquid component from the upper distillation zone overhead stream back to the upper distillation zone.

39. The method of claim 30 further comprising the step of:

refluxing the liquid component of the upper distillation zone overhead stream to provide the freezing zone liquid feedstream.

40. The method of claim 30 further comprising the step of:

refluxing the liquid component of the upper distillation zone overhead stream to provide both the methane-enriched liquid stream in the upper distillation zone and the freezing zone liquid feedstream.

41. A method of transforming a distillation column with a controlled freezing zone from start-up conditions to after start-up operating conditions comprising the steps of:
feeding at least one acid gas containing methane to a lower distillation zone;
producing in said lower distillation zone an enriched carbon dioxide liquid bottoms stream and a freezing zone vapor feedstream at a temperature and pressure at which substantially no carbon dioxide solids are formed;
contacting said freezing zone vapor feedstream with at least one freezing zone liquid feedstream containing methane in a controlled freezing zone at a temperature and pressure wherein both solids containing carbon dioxide and a methane-enriched vapor stream are formed;
contacting said methane-enriched vapor stream with a methane-enriched liquid stream in an upper distillation zone operated at a temperature and pressure at which substantially no carbon dioxide solids are produced to form an upper distillation zone overhead stream and an upper distillation zone bottoms stream;
stripping the acid gas components from the upper distillation zone overhead stream to produce an acid gas stripped stream;
separating said stripped stream into liquid and vapor components;
refluxing the liquid component of said stripped stream to the distillation column;
continuing the reflux of the distillation column until operating temperature has been achieved;
redirecting the upper distillation zone overhead stream from the stripping means to a separating means;
separating the upper distillation zone overhead stream into vapor and liquid components;
stripping the remaining acid gas components from the vapor component of the overhead stream; and
refluxing the liquid component of the overhead stream to the tower.

42. The method of claim 41 wherein the step stripping the vapor component of the overhead stream of the remaining acid gas components is accomplished by the same stripping means that was required for the step stripping the acid gas components from the upper distillation zone overhead stream.

43. The method of claim 41 further comprising the step of:
refluxing said liquid component of the overhead stream to the upper distillation zone.

44. The method of claim 41 further comprising the step of:
refluxing said liquid component of the overhead stream to provide the freezing zone liquid feedstream.

45. The method of claim 41 further comprising the step of:
refluxing said liquid component to the upper distillation zone and the freezing zone liquid feedstream.

46. A method of transforming a distillation column with a controlled freezing zone from start-up conditions to after start-up operating conditions comprising the steps of:
feeding at least one acid gas containing methane to a lower distillation zone;
producing in said lower distillation zone an enriched carbon dioxide liquid bottoms stream and a freezing zone vapor feedstream at a temperature and pressure at which substantially no carbon dioxide solids are formed;
contacting said freezing zone vapor feedstream with at least one freezing zone liquid feedstream containing methane in a controlled freezing zone at a temperature and pressure wherein both solids containing carbon dioxide and a methane-enriched vapor stream are formed;
contacting said methane-enriched vapor stream with a methane-enriched liquid stream in an upper distillation zone operated at a temperature and pressure at which substantially no carbon dioxide solids are produced to form an upper distillation zone overhead stream and an upper distillation zone bottoms stream;
stripping the acid gas components from the upper distillation zone overhead stream to produce an acid gas stripped stream;
separating said stripped stream into liquid and vapor components;
refluxing the liquid component of said stripped stream to the distillation column;
continuing the reflux of the distillation column until operating temperature has been achieved;
redirecting the upper distillation zone overhead stream from the stripping means to a separating means;
separating the upper distillation zone overhead stream into vapor and liquid components;
refluxing the liquid component of the overhead stream to the tower.

47. The method of claim 46 further comprising the step of:
refluxing said liquid component of the overhead stream to provide the freezing zone liquid feedstream.

48. An apparatus for start-up of a distillation column with a controlled freezing zone comprising:
a distillation column with a lower distillation zone and a controlled freezing zone;
an inlet to said lower zone of the distillation column for a feedstream comprising at least one acid gas and methane;
said lower distillation zone wherein an enriched carbon dioxide liquid bottoms stream and a freezing zone vapor feedstream are produced at a temperature and pressure at which substantially no carbon dioxide solids are formed;
said controlled freezing zone adjacent to said lower distillation zone with a controlled stream temperature and pressure wherein both a solids containing carbon dioxide and a methane-enriched vapor stream are formed;
a means for stripping the acid gas components from the methane-enriched vapor stream to produce an acid gas stripped stream;
a means for separating said stripped stream into liquid and vapor components; and
a means for refluxing the liquid component of said stripped stream to the distillation column.

49. The apparatus of claim 48 in which the stripping means comprise:
an adsorbent.

50. The apparatus of claim 48 in which the stripping means comprise:
a molecular sieve bed.

51. The apparatus of claim 48 in which the means for stripping comprises:
a molecular sieve bed utilizing pressure swing adsorption.

52. The apparatus of claim 48 in which the means for stripping comprises:
a molecular sieve bed utilizing thermal swing adsorption.

53. The apparatus of claim 48 in which the means for stripping comprises:
a molecular sieve bed utilizing thermal and pressure swing adsorption.

54. An apparatus for separating a feedstream containing at least one acid gas from methane comprising:
a distillation column comprised of a lower distillation zone and a controlled freezing zone;
an inlet to said lower zone of the distillation column for a feedstream comprising at least one acid gas containing methane;
said lower distillation zone of said distillation column operated at a temperature and pressure at which substantially no carbon dioxide solids are formed to produce an enriched carbon dioxide liquid bottoms stream and a freezing zone vapor feedstream;
said controlled freezing zone wherein a freezing zone liquid feedstream containing methane is contacted with said freezing zone vapor feedstream at a temperature and pressure wherein both solids containing carbon dioxide and a methane-enriched vapor stream are formed;
a means for separating said methane-enriched vapor stream into liquid and vapor components;
a means for refluxing the liquid component of the methane-enriched vapor stream to the column; and
a means for stripping the remaining acid components from the vapor component of the methane-enriched vapor stream.

55. The apparatus as recited in claim 54 in which the means for stripping comprises:
a molecular sieve bed.

56. The apparatus as recited in claim 54 in which the means for stripping comprises:
a molecular sieve bed utilizing pressure swing adsorption.

57. The apparatus as recited in claim 54 in which the means for stripping comprises:
a molecular sieve bed utilizing thermal swing adsorption.

58. An apparatus for transforming a distillation column with a controlled freezing zone from start-up conditions to after start-up operating conditions comprising:
a distillation column with a lower distillation zone and a controlled freezing zone;
an inlet to said lower zone of the distillation column for a feedstream comprising at least one acid gas containing methane;
said lower distillation zone wherein an enriched carbon dioxide liquid bottoms stream and a freezing zone vapor feedstream are produced at a temperature and pressure at which substantially no carbon dioxide solids are formed;
said controlled freezing zone wherein a freezing zone liquid feedstream containing methane is contacted with said freezing zone vapor feedstream at a temperature and pressure wherein both solids containing carbon dioxide and a methane-enriched vapor stream are formed;
a first means for stripping the acid gas components from the methane-enriched vapor stream to produce an acid gas stripped stream;
a means for separating said stripped stream into liquid and vapor components;
a means for refluxing the liquid component of said stripped stream to the distillation column;
a means for redirecting the methane-enriched vapor stream from the first means for stripping to a second means for separating where the methane-enriched vapor may be separated into vapor and liquid components;
a second means for stripping the remaining acid gas components from the vapor component of the methane-enriched vapor stream; and
a means for refluxing the liquid component of the methane-enriched vapor stream to the tower.

59. The apparatus as recited in claim 58 wherein the first stripping means and the second stripping means are the same means.

60. An apparatus for transforming a distillation column with a controlled freezing zone from start-up conditions to after start-up operating conditions comprising:
a distillation column with a lower distillation zone and a controlled freezing zone;
an inlet to said lower zone of the distillation column for a feedstream comprising at least one acid gas containing methane;
said lower distillation zone wherein an enriched carbon dioxide liquid bottoms stream and a freezing zone vapor feedstream are produced at a temperature and pressure at which substantially no carbon dioxide solids are formed;
said controlled freezing zone wherein a freezing zone liquid feedstream containing methane is contacted with said freezing zone vapor feedstream at a temperature and pressure wherein both solids containing carbon dioxide and a methane-enriched vapor stream are formed;
a first means for stripping the acid gas components from the methane-enriched vapor stream to produce an acid gas stripped stream;
a means for separating said stripped stream into liquid and vapor components;
a means for refluxing the liquid component of said stripped stream to the distillation column;
a means for redirecting the methane-enriched vapor stream from the first means for stripping to a second means for separating where the methane-enriched vapor may be separated into vapor and liquid components; and
a means for refluxing the liquid component of the methane-enriched vapor stream to the tower.

* * * * *